Patented Sept. 1, 1936

2,053,012

UNITED STATES PATENT OFFICE 2,053,012

PROCESS OF PREPARING SOLUBLE STARCH

Johannes Hendrik van der Meulen, Arnhem, Netherlands

No Drawing. Application May 2, 1934, Serial No. 723,615. In Germany May 5, 1933

11 Claims. (Cl. 127—33)

My invention relates to a process for preparing soluble starch and consists therein that starch or starch containing materials are treated with hypohalogenites in such a way that during the action of these hypohalogenites or after the action of these hypohalogenites the conversion takes place in the presence of free hydroxyl-ions and of nitrogen-hydrogen compounds, or derivatives thereof such as ammonia, ammonium bases, hydrazin, amines or amides, pyridin or the like.

The technical effect of the novel process is that the action of the hypohalogenites on starch, known in itself, which gives useful products in a heated state only, will take place at normal room temperature due to the presence of the above mentioned nitrogen-hydrogen compounds without any danger of a too powerful attack upon the starch which would result in a too powerful and undesired decomposition of the starch.

The conversion of starch into so called "soluble starch" is known per se. This has heretofore been achieved by processes which are based on an acid action or by processes which are based on alkali-actions. Finally—and this is the most important group of processes—starch may be converted into so called soluble starch by means of oxidizing agents. It has also been tried to introduce in practice for this purpose nearly all oxidizing agents including hypochlorites. A technically possible conversion, however, is obtained in most cases only at temperatures above the so called solubilizing-temperature, thus causing the decomposition-products of the materials, causing or accelerating the conversion, to form a starch-paste which cannot be removed therefrom.

On the contrary the process according to my invention gives products which satisfy all technical requirements. It is emphasized that my process enables me to produce products of any desired degree of fluidity. According to my process a soluble starch is obtained which is easily workable and which is most suitable for sizing and such like purposes; but further these products are obtained in a way which without technical difficulties and with the greatest reliability, may be performed within the shortest time. Further it is possible to obtain products which even in a 20% solution are thinly liquid and absolutely clear, which result could not be obtained up to now in a technically satisfactory way, and which satisfies a well-known desideratum of the sizing-art.

The products obtained according to my novel process are still starch to a large extent, as they give the pure blue colour with iodine and they do not reduce the usual copper salt solution such as the Fehling's solution as applied in analytical chemistry. Therefor, no appreciable decomposition has taken place.

According to my novel process I use hypohalogenites, i. e. hypochlorite or hypobromite, as an oxidizing agent. It is remarked, however, that hypochlorite as such is not able to cause the conversion of starch into soluble starch as is the case according to my invention. The conversion takes place if to the suspension of starch in diluted hypochlorite solution a sufficient quantity of a nitrogen-hydrogen compound is added; in practice ammonia can best be used. After this addition the reaction takes place nearly immediately giving a yellow colour to the starch and the liquid.

This conversion is very surprising as ammonia has a strong reducing influence upon hypochlorite and renders the latter substance inactive.

Further it has appeared that not only hypochlorite with ammonia will cause this peculiar conversion of the starch but that one may use with advantage hypobromites or a mixture of these hypohalogenites. Further it is immaterial whether one uses ready formed hypohalogenite, or whether the hypohalogenites are formed from chlorine and bromine with caustic alkali solution or alkaline reacting substances in the suspension of starch, after which the conversion takes place by means of the nitrogen-hydrogen compounds in the presence of free hydroxyl-ions. Further the necessary quantity of bromine may be reduced considerably by the addition of hypochlorite to the suspension of starch containing hypobromite. Also bromides with hypochlorites may be used according to my invention as these substances will give hypobromites. Also the nitrogen-hydrogen compounds e. g. ammonia may be formed in the suspension of starch, e. g. by the reaction of caustic alkali upon ammonium salts. Finally it is remarked that instead of ammonia also amines and ammonium bases, especially alkylamines may be used. Also substitution products, such as pyridin and such like compounds are suitable. In practice I prefer to use common ammonia. Further examples of nitrogen-hydrogen compounds which may be used according to my invention are e. g.: amino ethyl alcohol $CH_2.NH_2—CH_2OH$, glycocoll $CH_2NH_2COOH$, ethylene diamide $NH_2.CH_2.CH_2.NH_2$, hydrazine, hydroxylamine and the like, which are suitable for the conversion.

Tapioca starch behaves in the same way as potato starch. Also the other starches may be converted into soluble starch according to my novel process.

Examples 1. 1000 g. of potato starch (or of a different kind of starch) are agitated with 1.4 liter of water and thereupon 300 ccm. hypochlorite solution (containing 150 g. of active chlorine per liter) are added. The mixture is allowed to stand one hour, the liquid being stirred from time to time. Thereupon 300 ccm. of ammonia with 85 g. of $NH_3$ per liter are added while stirring, and the liquid is allowed to stand half an hour. The original snow white starch and also the liquid become yellow-brown, a vivid gas evolution taking place. After half an hour the liquid is filtered off by suction, the solid matter is washed with water and the feebly yellow coloured product is stirrred with 1500 ccm. of water and treated with 10 to 25 ccm. bleaching lye converting the yellow colour into white. After 10 or 15 minutes one acidifies slightly with hydrochloric acid, the excess of chlorine or hypochlorite is removed by means of $NaHSO_3$ solution, filtered, washed and dried carefully in the known way.

A 10% solution of the product obtained by treating potato starch in the above way, is clear and liquid as water, even after some days only a feeble opalescene occurs and this solution is most suitable for fine sizings.

If instead of 300 ccm. hypochlorite only 200 ccm. or 100 ccm. are used one obtains products which when subsequently boiled give solutions which are thick liquid after cooling and which after a long time solidify to a paste-like mass. These products look different from the products known up to now.

That the hypochlorite as such does not cause the conversion seems clear from the fact that after an action of one hour of the hypochlorite and after washing the product obtained in this way, the same gives after boiling a thick and tough mass which does not differ from the original starch. Also starch which has been treated with ammonia and washed again gives after boiling the orignal thick and tough mass. The combined action of hypochlorite and ammonia is able to convert the starch into soluble starch.

A sample of starch taken five minutes after the addition of the ammonia, and washed showed after boiling complete solubility and clearness and remained transparent and liquid also after cooling.

2. 250 g. of potato starch is stirred in water (350 ccm.) and without waiting first 75 ccm. of ammonia (85 g. of $NH_3$ per liter) and thereupon 75 ccm. of hypochlorite solution (150 g. of active chlorine per liter) are added, the mass being stirred now and then, during 30 minutes. The starch is filtered, washed, distributed in water again bleached and worked up as indicated in Example 1.

It is remarked that after five minutes the starch will be converted nearly completely into the novel easily soluble modification.

3. 1 kg. of potato starch is stirred with 1.4 liter of water and 300 ccm. normal hypobromite solution are added. After 30 minutes 100 ccm. ammonia 5-normal are added to the suspension and after a reaction of 30 minutes the liquid is sucked from the starch, the starch is washed and purified in the known way.

4. To 1 kg. of potato starch are added 100 ccm. of hypobromite solution, 100 ccm. 4-normal hypochlorite solution and further 100 ccm. ammonia 5-normal, and worked up in the known way.

As used in the present specification, the words "solubilize" and "solubilization" have reference to the effect of the present process upon raw starch, whereby it is rendered miscible with cold water to form a smooth paste which does not gelatinize and which may be diluted with water to form a clear solution.

In my Patent No. 2,053,013 granted September 1, 1936, I have described and claimed a process of converting raw starch into soluble starch by treatment with a mixture of a hypobromite and a hypochlorite.

I claim:—

1. A process of preparing soluble starch from starch or starch containing products by the reaction of at least one hypohalogenite of the class consisting of hypochlorites and hypobromites upon starch suspended in water characterized by the feature that the conversion is carried out in the presence of free hydroxyl-ions and in the presence of at least one nitrogen-hydrogen compound.

2. A process as claimed in claim 1 characterized by the feature that the nitrogen-hydrogen compound is added in the form of a derivative thereof.

3. A process as claimed in claim 1 characterized by the feature that ammonia is used as the nitrogen-hydrogen compound.

4. A process of making soluble starch which comprises treating a suspension of starch in water, with a soluble hypohalogenite of the class consisting of hypochlorites and hypobromites and with a nitrogen-hydrogen compound in an alkaline medium.

5. Process as in claim 4 in which the hypohalogenite is added first to the starch suspension.

6. Process as in claim 4, in which an alkaline nitrogen-halogen compound is added first to the starch suspension.

7. Process as in claim 4, in which the nitrogen-hydrogen compound is ammonia.

8. Process which comprises treating starchy material suspended in water, with hypochlorite in solution, and thereafter treating same with ammonia.

9. A process which comprises adding to a mixture of about 1000 parts of starch and about 1400 parts of water, about 300 parts of hypochlorite solution containing about 150 grams of active chlorine per liter, then allowing reaction to go on for about an hour, adding 300 parts of ammonia water containing about 85 g. of $NH_3$ per liter, and allowing reactions to go on for about an hour.

10. Process as in claim 9, in which the materials are used at about normal atmospheric temperature.

11. Process as in claim 4, in which both a hypochlorite and a hypobromite are added in the first mentioned step.

JOHANNES HENDRIK VAN DER MEULEN.